United States Patent [19]

O'Halloran

[11] E Patent Number: Re. 33,546

[45] Reissued Date of Patent: Mar. 5, 1991

[54] ADJUSTABLE HOLD DOWN FOR A RECIPROCATING CUTTER ASSEMBLY

[75] Inventor: Michael L. O'Halloran, Hesston, Kans.

[73] Assignee: Hay & Forage Industries, Hesston, Kans.

[21] Appl. No.: 143,286

[22] Filed: Jan. 7, 1988

Related U.S. Patent Documents

Reissue of:

[64] Patent No.: 4,553,380
Issued: Nov. 19, 1985
Appl. No.: 557,878
Filed: Dec. 5, 1983

U.S. Applications:

[63] Continuation of Ser. No. 861,328, May 9, 1986, abandoned.

[51] Int. Cl.[5] ..... A01D 55/06

[52] U.S. Cl. ..... 56/305; 56/296

[58] Field of Search ..... 56/296, 298, 307, 309, 56/310, 297, 305

[56] References Cited

U.S. PATENT DOCUMENTS

| | | | |
|---|---|---|---|
| 504,641 | 9/1893 | Walton | 56/305 |
| 870,358 | 11/1907 | Griffiths | 56/305 |
| 1,428,657 | 9/1922 | Purdy | 56/305 |
| 1,538,282 | 5/1925 | Fry | 56/311 |
| 1,583,167 | 5/1926 | Pehrson | 56/305 |
| 1,754,302 | 4/1930 | Barlow | 56/305 |
| 1,810,081 | 6/1931 | Kucha | 56/311 |
| 2,024,309 | 12/1935 | Smith | 56/305 |
| 3,162,991 | 12/1964 | Maxant | 56/305 |
| 3,314,222 | 4/1967 | Scarnato et al. | 56/305 |
| 3,455,093 | 7/1969 | Stern | 56/305 |
| 3,487,616 | 1/1970 | Schenk | 56/305 |
| 3,722,196 | 3/1973 | Templeton | 56/298 |
| 4,012,891 | 3/1977 | Stenerwald | 56/305 |
| 4,387,554 | 6/1983 | Bedogni | 56/298 |

FOREIGN PATENT DOCUMENTS

| | | | |
|---|---|---|---|
| 1123860 | 2/1962 | Fed. Rep. of Germany | 56/305 |
| 2054889 | 5/1972 | Fed. Rep. of Germany | 56/298 |
| 458821 | 6/1968 | Switzerland | 56/298 |

*Primary Examiner*—John Weiss

*Attorney, Agent, or Firm*—Hovey, Williams, Timmons & Collins

[57] ABSTRACT

A hold down for retention of reciprocable sickles of cutter assemblies is characterized by its inflexibility and provision of adjustability in relation to the cutter bar such as to preclude undue movement of the sickle sections away from their normal scissors-like cutting positions in cooperation with the sickle guards on the cutter bar. A strong, massive hold down body permits minimum running clearance of the sickle beneath wear pads on forwardly extending fingers integral with the body. After adjustment of a extensible bolt and nut assembly between the hold down and the cutter bar and clamping of the hold down to the cutter bar, essentially trouble-free use can be expected without undue clogging or failure to easily cut even the toughest of grasses, weeds, and crops generally.

22 Claims, 1 Drawing Sheet

ADJUSTABLE HOLD DOWN FOR A RECIPROCATING CUTTER ASSEMBLY

Matter enclosed in heavy brackets [ ] appears in the original patent but forms no part of this reissue specification; matter printed in italics indicates the additions made by reissue.

This application is a reissue of application Ser. No. 06/861,328, filed May 9, 1986 abandon 2/18/88.

BACKGROUND

Universally, without exception, cutter assemblies of the kind having reciprocable sickles have, from the time of first use, been troublesome because of clogging, breakage, wearability, and the failure to provide a proper cutting action. The greatest of the problems has been in maintaining the cutter sections of the sickle in full sliding relationship to the underlying sickle guards such as to assure a scissors-like action in cooperation with the ledger plates on the guards or with the inclined cutting edges of the guards. Heavy grasses, especially when wet, dirt, rocks, and other debris tend to clog the cutter assembly, cause lifting of the sickle sections off the guards as well as breakage of both the sections and the guards.

Hence it has always been necessary to provide some type of clip or hold down in an effort to retain the sickle in place, but no fully satisfactory solution has heretofore been suggested or placed in use. Prior retainers have yieldable characteristics which fail to prevent upward movement of the sickle off the guards and even when they are somewhat satisfactory at the outset, wear on the retainers themselves and on the sickle sections soon results in substantial ineffectiveness.

SUMMARY OF THE INVENTION

Therefore, in accordance with the concepts of my present invention, there is provided a hold down, which by its very massive, solid shape and strength cannot yield to upward pressure of the sickle and which, in conjunction with such characteristics, has a novel way of setting and maintaining a predetermined, minimum running clearance for the sickle between the underlying guards and the overlying wear pads of the sickle retaining hold down. To this end also, compensation for wear is accomplished easily and quickly by adjustment of an extensible bolt and nut assembly between a portion of the cutter bar and the back of the hold down body.

Related to the present invention in terms of general subject matter are U.S. Pat. Nos. 3,553,948; 4,021,999; and 4,246,742, together with presently pending U.S. patent application Ser. No. 06/498,412, filed May 26, 1983, in the name of Howard R. Lohrentz.

DETAILED DESCRIPTION

Figure 1:
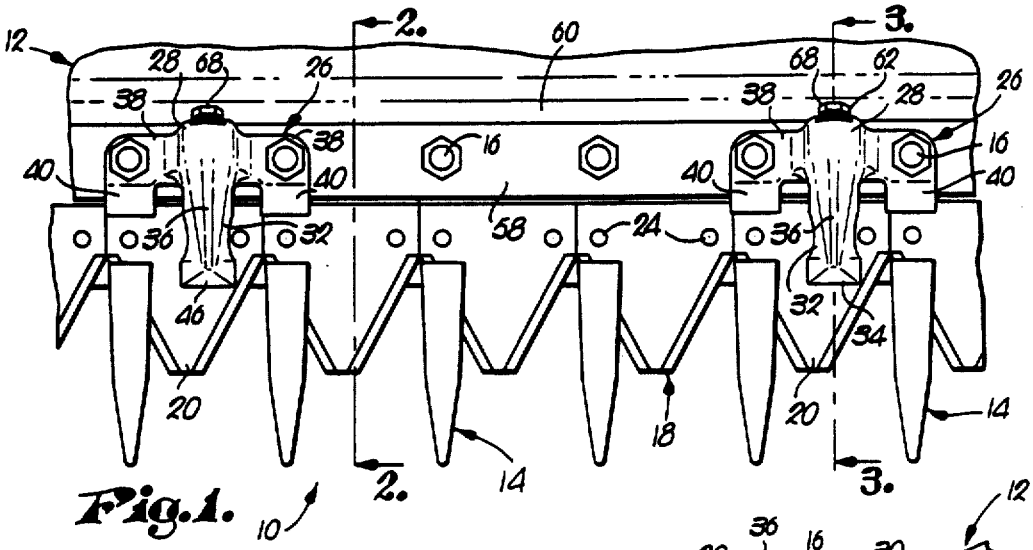
FIG. 1 is a fragmentary, plan view of the cutter assembly showing a pair of sickle hold downs made pursuant to my present invention.

A cutter assembly 10, as shown in FIGS, 1-3, includes an elongated cutter bar 12 having a plurality of spaced sickle guards 14 extending forwardly therefrom, each releasably secured to the bar 12 by a bolt and nut assembly 16. An elongated, longitudinally reciprocable sickle 18 supported by the guards 14 has a series of cutter sections 20 each mounted on a longitudinally extending sickle bar 22 by a pair of rivets 24. Each of a number of identical, spaced apart, metallic hold downs 26 for the sickle 18, made according to the present invention, is mounted on the bar 12 by a pair of the fastener assemblies 16.

As a unitary article of manufacture, each essentially hump-shaped hold down 26 includes a median body 28 made from a strong, solid mass of material and provided with a rearmost end 30 that is normally inclined upwardly and rearwardly as the upper extremity of the body 28 is approached. The somewhat E-shaped hold down 26 has an elongated, median finger 32 integral with and extending forwardly from the body 28. The length, height, and width of the body 28 and its finger 32 are greatest near the end 30 such that there is a progressive decrease in the height and width of the body 28 and the finger 32 as normally forward end 34 of the finger 32 is approached, presenting an inclined ridge 36.

The body 28 and the finger [22] *32* are in the nature of a compact, firm and stable, homogeneous mass of strong material having a magnitude which is thick and solid such that the shapes thereof are essentially unchangeable, either permanently or substantially without fracture.

Well below the upper, rear extremity of the body 28 there is provided a pair of opposed L-shaped wings having flat tops, each including a lateral extension 38 integral with the body 28 at the end 30 and a forwardly projecting arm or supplemental stub finger 40 spaced from and substantially shorter than the finger 32.

Figure 2:
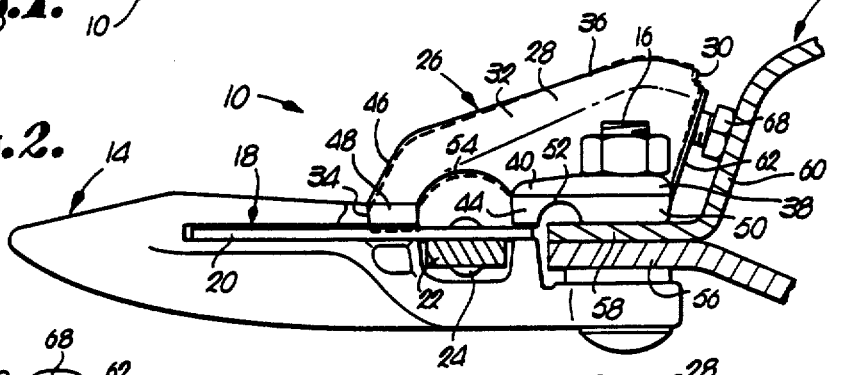
FIGS. 2 and 3 are enlarged, fragmentary, cross sectional views taken on lines 2—2 and 3—3 respectively of FIG. 1, the phantom lines in FIG. 2 indicating the median finger of the hold down rocked forwardly and downwardly in a slight adjusting movement thereof relative to the stationary, lateral, wings of the hold down.
Figure 5:
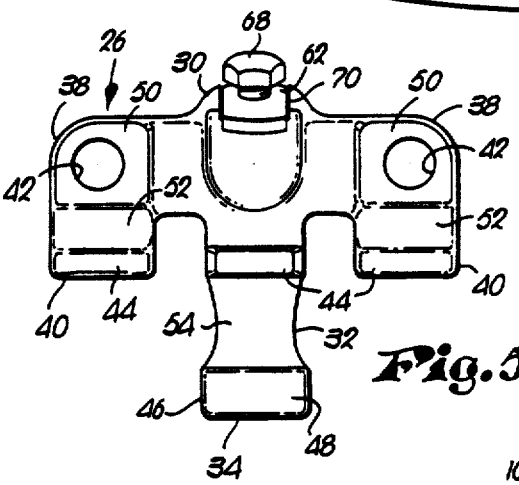
FIG. 5 is an enlarged, inverted view of said one hold down.
Figure 4:
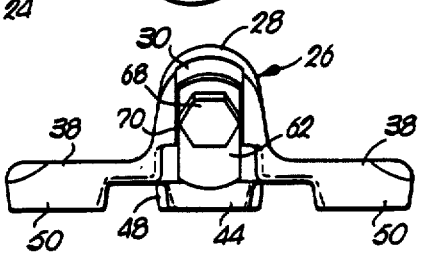
FIG. 4 is an enlarged, rear, elevational view of the rearmost end of one of the hold downs shown in FIG. 1.
Figure 3:
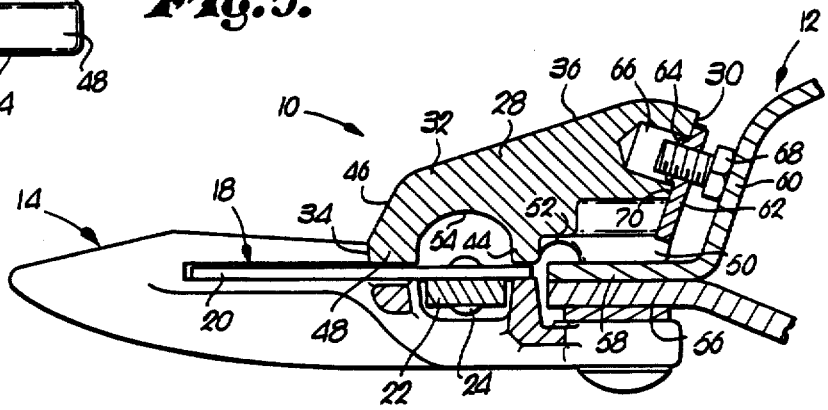

*As shown in FIGS. 1, 2 and 4, the finger 22 has a thickness substantially exceeding that of the wing extensions 38.*

The bottom of the hold down 26 has three elongated, narrow, spaced apart, aligned wear pads 44, one for the finger 32 and one for each stub finger 40 respectively. Each extension 38 has a hole 42 receiving one of the fasteners 16. The finger 32 has a down-turned ear 46 at the end 34 provided with a wear pad 48 that is wider than but parallel with the pads 44.

Each extension 38 has a substantially square area 50 of increased thickness around its hole 42, the lower faces of which are flat and coplanar with the flat bottoms of the pads 44 and 48. Transverse grooves 52 in the fingers 40 separate the areas 50 and the corresponding pads 44 of the fingers 40. The finger 32 has a transverse groove 54 which clears the upper heads of the rivets 24. The groove 54 is sized to clear the bar 22 of sickles 18 having the sections 20 disposed below the bar 22.

The cutter bar 12 has a pair of elongated legs 56 and 58, the latter of which is L-shaped presenting an upwardly and rearwardly inclined leg 60. The legs 56, 58 are clamped between the guards 14 and the extensions 38 by the fasteners 16 with the areas 50 flatly engaging the leg 58.

Extensible means is interposed between the leg 60 and the end 30 to bias the finger 32, and therefore the fingers 40, downwardly and hold the same in position for slidable engagement of the sections 20 with the pads 44 and 48. Such extensible means includes a nut and bolt assembly and a plate 62 engaging the end 30. The nut 64 of such assembly is integral with the plate 62 and disposed within a retaining socket 66 in the end 30. The bolt 68 extends into the socket 66 and has its head engaged in the leg 60.

The plate 62 is disposed within a retaining slot 70 in the end 30. If need be, after adjustment, the hold down 26 may be clamped even more tightly against the leg 58 by turning the nuts of the fasteners 16.

During use there is a minimum amount of upward movement of the sickle 18 out of the proper scissors-like cutting relationship between the cooperating cutting edges of the section 20 and the guards 14, such movement being resisted by the pads 44, and especially by the enlarged pad 48. The finger 32, and in fact, the entire body 28 cannot rise with respect to the guards 14 because virtually all springiness, flexure, and yieldability is designed out of the hold down 26 by its inherent shape and strong, massive characteristics.

To such extent that the sections 20 might rise from time to time, either bodily or in a tilting manner about their rearmost edges behind the bar 22, they merely slide along the pad 48 and/or pads 44. As the sections 20 and/or the pads 44, 48 wear away, such wear is easily and quickly compensated by adjustment of the bolt 68. As illustrated by the phantom lines in FIG. 2, such adjustment of the bolt 68 results in a slight, downward and forward rocking of the median finger 32 relative to the wings of the hold down and without loosening the fasteners 16. As a result, hard-to-cut crops and weeds, and particularly tough, wet or dry grasses are handled with ease in substantial absence of clogging, especially by dirt and debris. Because of such advantages, coupled with easier cutting action, breakage of sections 20, guards 14, and sickle-retaining hold downs 26 is minimized even in rocky conditions. Hence, the essentially unbreakable, unbendable hold down 26 have a long useful life, even if adjustment is made from time to time through use of the bolt 68 eliminating the need for frequent replacement of the hold downs 26.

And, because of minimal up and down movement of the sickle 18, both the guards 14 and the sickle 18 have an equally long useful life. The closeness of the fit of the sickle 18 relative to the guards 14, made possible by my novel, easily installed and easily adjusted hold downs 26, reduces the need for close manufacturing tolerances for all parts of the assembly 10.

Hold downs 26 provide better sickle retention than has heretofore been possible regardless of the nature of the guards 14 selected for the assembly 10. If desired, the nut 64 and the bolt 68, as well as the plate 62, may be made from, plated or coated with, rust resistant material, and the socket 62 may be filled with protective grease or the like to assure easy turning of the bolt 68 even after long use of the assembly 10.

I claim:

1. For use with a cutter bar having a plurality of spaced sickle guards secured thereto, extending forwardly therefrom and supporting a reciprocable sickle, a sickle hold down for overlying the sickle and including:

a body having means for attaching the same to the cutter bar;

a finger integral with the body and extending forwardly therefrom for overlying the sickle and terminating in a forward end; and extensible means disposed for insertion between the cutter bar and the body behind the latter for biasing the finger downwardly toward the sickle, said means for attaching the body to the cutter bar including a pair of wing extensions integral with the finger and projecting laterally outwardly from opposite sides thereof adjacent a rearward end of the finger, said wing extensions each having a hole therethrough adapted to receive an elongated fastener for use in attaching the body to the cutter bar and for holding the wing extensions fixed against movement, said finger having a thickness substantially exceeding that of the wing extensions whereby to permit the finger to rock slightly forwardly and downwardly relative to the wing extensions in an adjusting movement when the extensible means is extended without first loosing the fasteners.

2. The invention of claim 1, said finger having a wear pad at said forward end, said extensible means being disposed to hold the pad in position for slidable engagement of the sickle therewith.

3. The invention of claim 1, said wing extensions having forward portions disposed for overlying the sickle rearwardly of and on opposite sides of said forward end of the finger.

4. The invention of claim 3, said finger and said forward portions of the wing extensions having wear pads.

5. The invention of claim 1, said finger being hump-shaped presenting an upper ridge sloping downwardly and forwardly as said forward end of the finger is approached.

6. The invention of claim 5, said finger being a solid, compact, firm and stable, homogeneous mass of strong, metallic material having a magnitude which progressively decreases in length, breadth, and thickness as said forward end of the finger is approached, rendering said shape essentially unchangeable either permanently or substantially without fracture.

7. In combination with an elongated sickle reciprocably supported on a plurality of guards secured to and extending forwardly from an elongated cutter bar, a hold down having:

a central elongated finger provided with a normally forwardmost end and a normally rearmost end, said finger progressively decreasing in thickness as said forwardmost end is approached;

a pair of wing extensions integral with the finger and projecting laterally outwardly from opposite sides thereof adjacent said rearmost end, said wing extensions each receiving an elongated fastener attaching the hold down to the cutter bar and (holding the wing extensions fixed against movement,)

said finger having a thickness substantially exceeding that of the wing extensions; and extensible means above and behind the fasteners engageable with said rearmost end of the finger and with the cutter bar for rocking the finger slightly forwardly and downwardly relative to the wing extensions in an adjusting movement with the extensible means is extended without first loosing the fasteners.

8. The invention of claim 7, wherein said cutter bar is transversely L-shaped, presenting a forwardly extending leg clamped to the wing extensions by said fasteners and an upstanding leg engaged by said extensible means.

9. The invention of claim 7, said hold down having a downturned ear forming said foremost end thereof.

10. The invention of claim 9, said wing extensions being L-shaped, presenting forwardly extending arms, there being wear pads on the arms and on said ear disposed for slidable engagement therewith by the sickle.

11. The invention of claim 10; and a wear pad on the hold down rearwardly of the ear in alignment with the wear pads on the arms.

12. The invention of claim 10, said pads having coplanar lowermost surfaces.

13. The invention of claim 7, said extensible means including a bolt and nut assembly.

14. The invention of claim 13, said extensible means including a plate engaging said rearmost end and having the nut of said assembly integral with the plate.

*15. A hold down for use with a reciprocable sickle and an associated support bar extending generally parallel to the path of reciprocation of the sickle, said hold down having:*

*a central elongated finger having a normally forward end and a normally rearward end,*

*said forward end being provided with a normally downwardly facing retaining surface disposed to overlie the sickle when the hold down is mounted on the bar;*

*a pair of wings having integral connections with the finger and projecting laterally outwardly from opposite sides thereof generally adjacent said rearward end of the finger,*

*said finger, said wings and said connections of the wings to the finger being integrally formed and joined together into a unitary, one-piece component,*

*each of said wings including mounting portions disposed to overlie the bar when the hold down is mounted thereon;*

*a hole through the mounting portion of each wing by which the hold down may be bolted to the bar; and*

*an adjusting screw threadably received by said finger in disposition for operating engagement with the bar when the hold down is mounted thereon for slightly flexing the finger about its integral connections with the wings when the screw is rotated, whereby to adjust the position of said downwardly facing surface of the finger relative to the sickle.*

*16. A hold down as claimed in claim 15, wherein each of said wings has a retaining portion projecting forwardly from said mounting portion and terminating in a forward extremity spaced rearwardly from said forward end of the finger, each of said retaining portions having a downwardly facing surface adjacent said forward extremity disposed to overlie a rear edge of the sickle when the hold down is installed on the bar.*

*17. A hold down as claimed in claim 16, wherein said finger is provided with a second downwardly facing retaining surface spaced rearwardly from the retaining surface at said forward end and disposed to overlie said rear edge of the sickle when the hold down is installed on the bar, said finger having a transverse clearance concavity disposed between said retaining surfaces of the finger.*

*18. A hold down as claimed in claim 15, wherein said adjusting screw projects rearwardly from said rearward end of the finger.*

*19. In combination with an elongated sickle reciprocably supported on a plurality of guards secured to and projecting forwardly from an elongated support bar extending generally parallel to the path of travel of the sickle, a hold down having:*

*a central elongated finger having a normally forward end and a normally rearward end,*

*said forward end being provided with a downwardly facing retaining surface overlying the sickle;*

*a pair of wings having integral connections with the finger and projecting laterally outwardly from opposite sides thereof generally adjacent said rearward end of the finger,*

*said finger, said wings and said communication of the wings to the finger being integrally formed and joined together into a unitary, one-piece component,*

*each of said wings including mounting portions overlying and secured to said bar; and*

*an adjusting screw threadably received by said finger in operating engagement with the bar for slightly flexing the finger about its integral connections with the wings when the screw is rotated, whereby to adjust the position of said downwardly facing surface of the finger relative to the sickle.*

*20. The combination as claimed in claim 19, wherein each of said wings has a retaining portion projecting forwardly from said mounting portion and terminating in a forward extremity spaced rearwardly from said forward end of the finger, each of said retaining portions having a downwardly facing surface adjacent said forward extremity overlying a rear edge of the sickle.*

*21. The combination as claimed in claim 20, wherein said finger is provided with a second downwardly facing retaining surface spaced rearwardly from the retaining surface at said forward end and overlying said rear edge of the sickle, said finger having a transverse clearance concavity disposed between said retaining surfaces of the finger.*

*22. The combination down as claimed in claim 18, wherein said bar is generally transversely L-shaped, having a horizontal leg underlying the wings of the hold down and an upright leg disposed behind the hold down, said adjusting screw projecting rearwardly from said rearward end of the finger for engagement with said upright leg of the bar.*

* * * * *